US012638648B2

(12) United States Patent　　　　　(10) Patent No.:　US 12,638,648 B2

Rakoto-Sam　　　　　　　　　　　　(45) Date of Patent:　May 26, 2026

(54) OPTIC FIBER CASSETTE AND RETAINER ASSEMBLY FOR SAME

(71) Applicant: BELDEN CANADA ULC, Saint-Laurent (CA)

(72) Inventor: Lucas Rakoto-Sam, Montreal (CA)

(73) Assignee: Belden Canada ULC, Saint-Laurent (CA)

( * ) Notice: Subject to any disclaimer, the term of this patent is extended or adjusted under 35 U.S.C. 154(b) by 189 days.

(21) Appl. No.: 18/463,804

(22) Filed: Sep. 8, 2023

(65) Prior Publication Data

US 2024/0085651 A1　　Mar. 14, 2024

Related U.S. Application Data

(60) Provisional application No. 63/375,039, filed on Sep. 8, 2022.

(51) Int. Cl.
　　　*G02B 6/00*　　　　　(2006.01)
　　　*G02B 6/44*　　　　　(2006.01)
(52) U.S. Cl.
　　　CPC ................................. *G02B 6/4455* (2013.01)
(58) Field of Classification Search
　　　CPC .............. G02B 6/4455; G02B 6/44526; G02B 6/4453; G02B 6/00
　　　See application file for complete search history.

(56) References Cited

U.S. PATENT DOCUMENTS

| | | | |
|---|---|---|---|
| 7,751,674 B2 | 7/2010 | Hill | |
| 8,059,932 B2 | 11/2011 | Hill et al. | |
| 8,307,996 B2 | 11/2012 | Taylor | |
| 8,746,466 B2 | 6/2014 | Taylor | |
| 8,818,157 B2 * | 8/2014 | Burek | G02B 6/44528 |
| | | | 385/135 |
| 10,295,771 B2 * | 5/2019 | Burkett | G02B 6/44526 |
| 10,545,307 B2 | 1/2020 | Vongseng et al. | |
| 11,150,420 B2 | 10/2021 | Bolster et al. | |
| 2015/0212286 A1 | 7/2015 | Vongseng et al. | |
| 2018/0231718 A1 | 8/2018 | Bolster et al. | |

OTHER PUBLICATIONS

ISR and Written Opinion of corresponding PCT/CA2023/051193 issued on Sep. 25, 2023.

* cited by examiner

*Primary Examiner* — Jennifer Doan
(74) *Attorney, Agent, or Firm* — MH2 Technology Law Group, LLP

(57)　　　　　　　ABSTRACT

There is disclosed an optic fiber cassette, comprising a housing, at least one cable spool, at least one retainer. The housing comprises a cable retaining surface, each of the at least one cable spool extends above the cable retaining surface, each of the at least one retainer is secured to an outer free end of a respective one of the at least one cable spool and each of the at least one retainer comprises a pair of fingers extending outwards from the central portion in order to prevent optic fibers held within the cassette from being dislodged from the cable retaining surface.

22 Claims, 9 Drawing Sheets

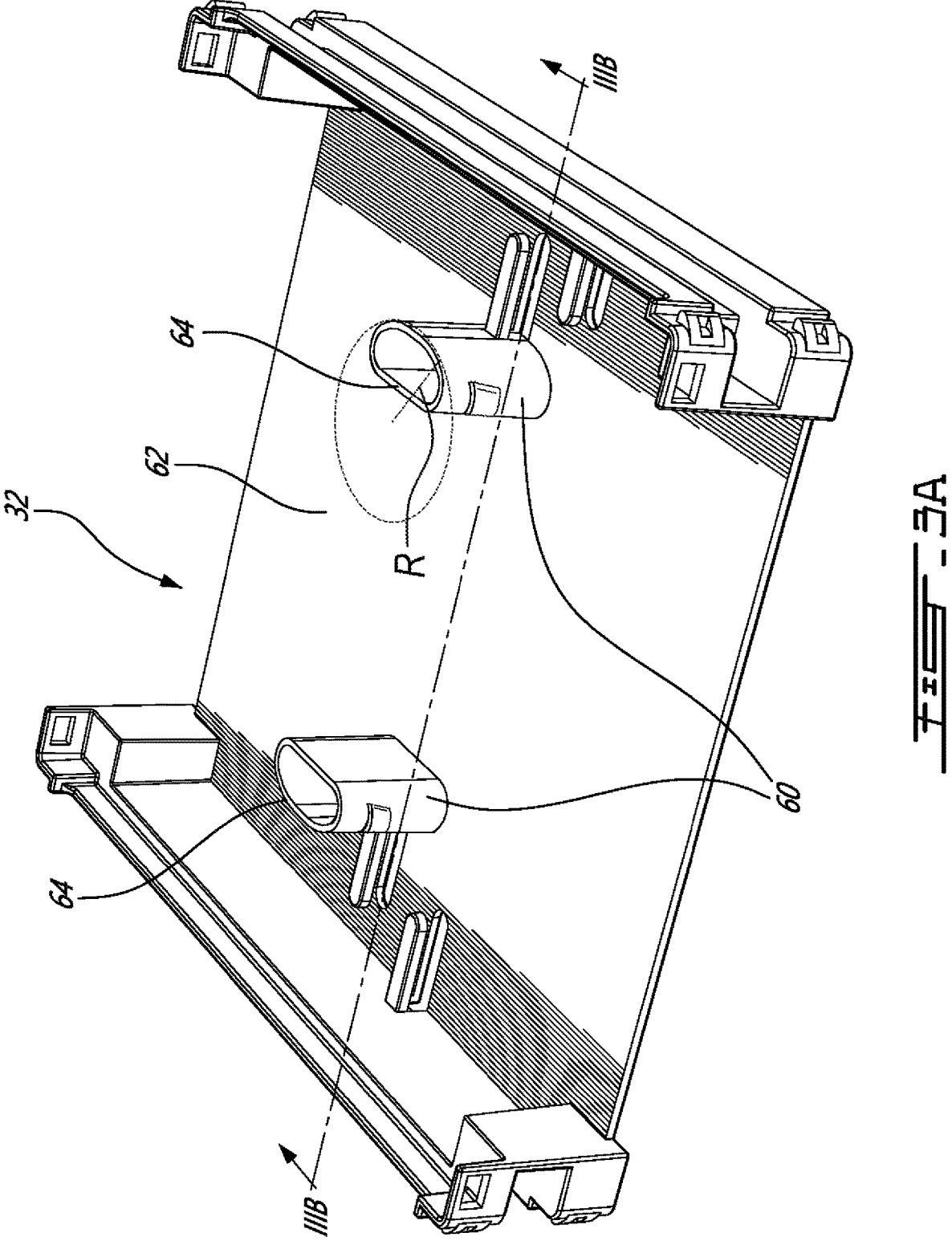
_FIG_ - _3A_

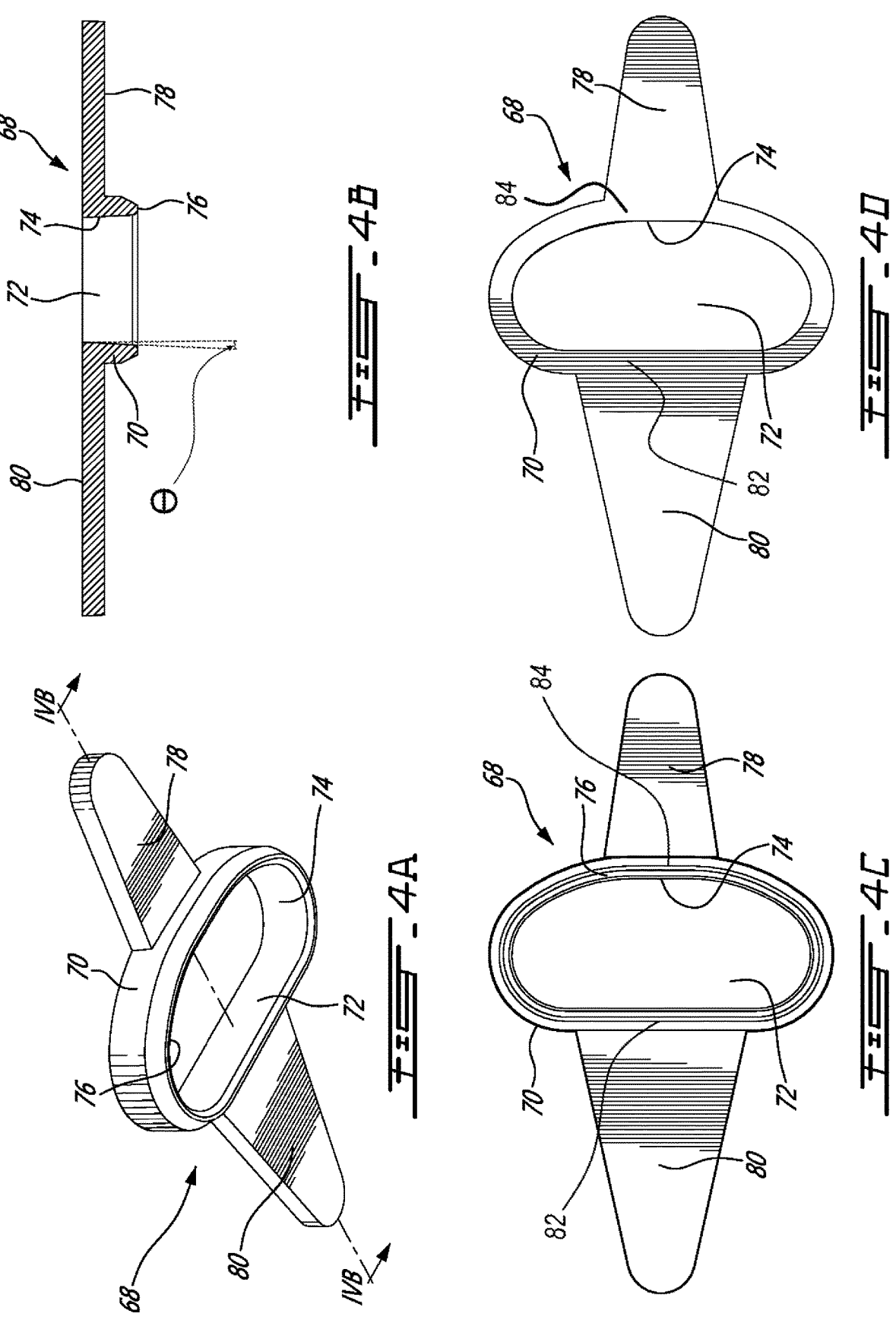

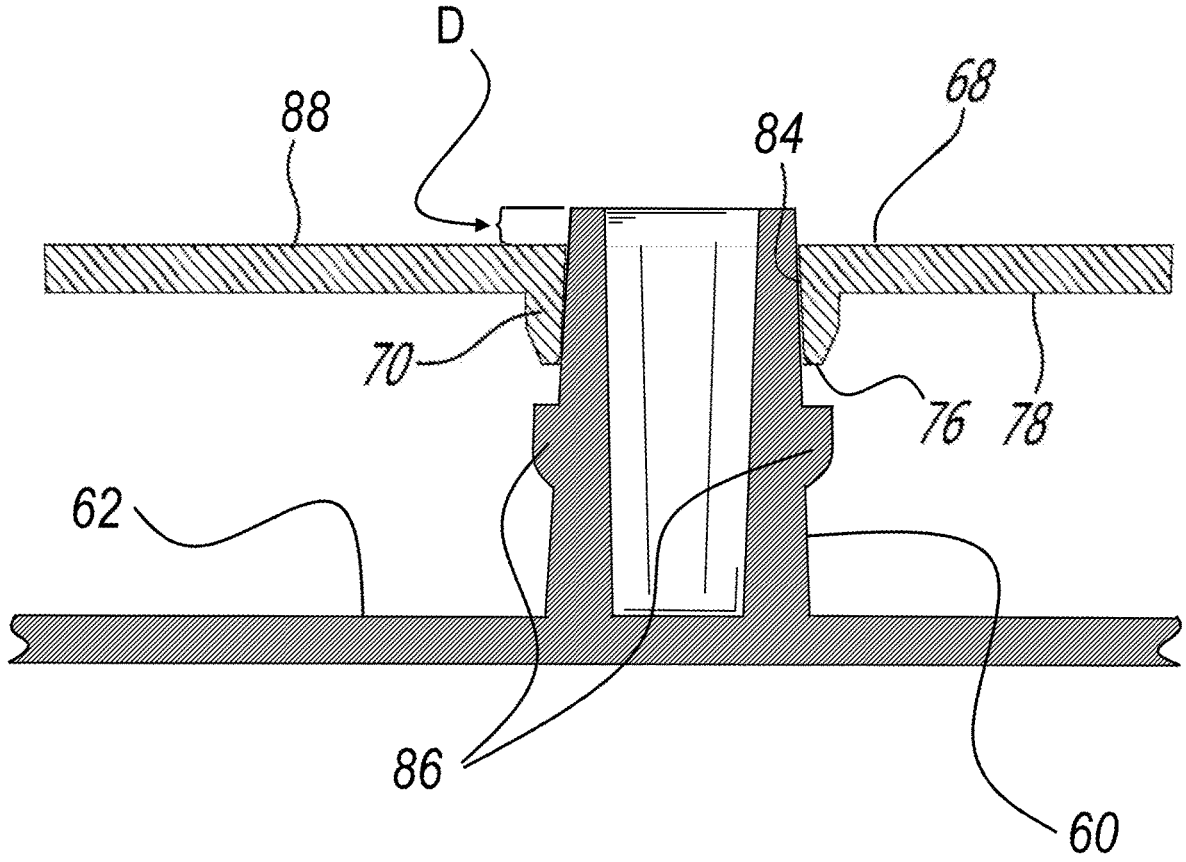

OPTIC FIBER CASSETTE AND RETAINER ASSEMBLY FOR SAME

CROSS REFERENCE TO RELATED APPLICATIONS

Benefit is claimed of U.S. provisional application Ser. No. 63/375,039 filed Sep. 8, 2022 which is incorporated herein in its entirely by reference.

FIELD OF THE INVENTION

The present invention relates to an optic fiber cassette and retainer assembly for same.

BACKGROUND TO THE INVENTION

The prior art reveals pre-terminated optic fiber cassettes comprising single-fiber and multi-fiber adaptors interconnected by preinstalled optic fibers. One drawback of such pre-terminated optic fiber cassettes is that they are generally unsuitable for field installation in that the optic fibers are difficult to access and install or remove.

SUMMARY OF THE INVENTION

In order to address the above and other drawbacks there is provided an optic fiber cassette comprising a housing, a pair of cable spools and a pair of retainers. The housing comprises a cable retaining surface, a pair of side edges on opposite sides of the cable retaining surface, a first panel extending between first ends of the pair of side edges along a first edge of the cable retaining surface and a second panel extending between second ends of the pair of side edges along a second edge of the cable retaining surface, the cable retaining surface, the first panel, the second panel and the pair of opposed side edges together define a fiber optic cable receiving space. Each of the cable spools extends above the cable retaining surface within the fiber optic cable receiving space. Each of the cable spools are tapered inwards between the cable retaining surface and an outer end thereof. Each of the retainers comprises a central portion defining an aperture. Each of the retainers comprises a pair of fingers extending outwards in opposite directions from the central portion. An inner surface of the aperture is tapered and fits about the outer end of a respective one of the cable spools in a friction fit. A plurality of fiber optic cable adaptors are arranged along the first panel. At at least one multi-fiber optic cable adaptor is arranged along the second panel. An optic fiber interconnects each of the plurality of fiber optic cable adaptors and one of the at least one multi-fiber optic cable adaptor. An intermediate portion of each of the optic fibers is wound about each of the pair of cable spools. Each of the retainers is installed on respective ones of the pair of cable spools, and the fingers of each retainer extend away from the respective cable spool above the cable retaining surface.

There is also provided an optic fiber cassette comprising a housing comprising a cable retaining surface, at least one fiber retaining assembly each comprising a cable spool extending above the cable retaining surface and a retainer towards an outer free end of the cable spool. For each of the at least one fiber retaining assembly. The cable spool extends above the cable retaining surface, the retainer comprises a central portion defining an aperture, the retainer comprises a plurality of fingers extending outwards from the central portion, and an inner surface of the retainer fits about the outer free end of the cable spools in a friction fit. At least one first fiber optic cable adaptor is arranged along a first edge of the cable retaining surface. At least one second fiber optic cable adaptor is arranged along a second edge of the cable retaining surface, and an optic fiber interconnects each of the at least one first fiber optic cable adaptor with the at least one second fiber optic cable adaptor.

Furthermore, there is provided an optic fiber cassette comprising a housing, at least one cable spool and at least one retainer. The housing comprises a cable retaining surface. Each of the at least one cable spool extends above the cable retaining surface. Each of the at least one retainer is secured to an outer free end of a respective one of the at least one cable spool, and each of the at least one retainer comprises at least one finger.

BRIEF DESCRIPTION OF THE DRAWINGS

FIG. 3A provides a right raised perspective view of a fiber optic cassette housing in accordance with an illustrative embodiment of the present invention;

FIG. 4A provides a right lowered perspective view of a removable retainer in accordance with an illustrative embodiment of the present invention;

FIG. 4B provides a sectional view along line IVB-IVB in FIG. 4A;

FIG. 4C provides a bottom plan view of a removable retainer in accordance with an illustrative embodiment of the present invention;

FIG. 4D provides a top plan view of a removable retainer in accordance with an illustrative embodiment of the present invention;

FIG. 5 provides a sectional view along line V-V in FIG. 2; and

DETAILED DESCRIPTION OF THE ILLUSTRATIVE EMBODIMENTS

Figure 1:
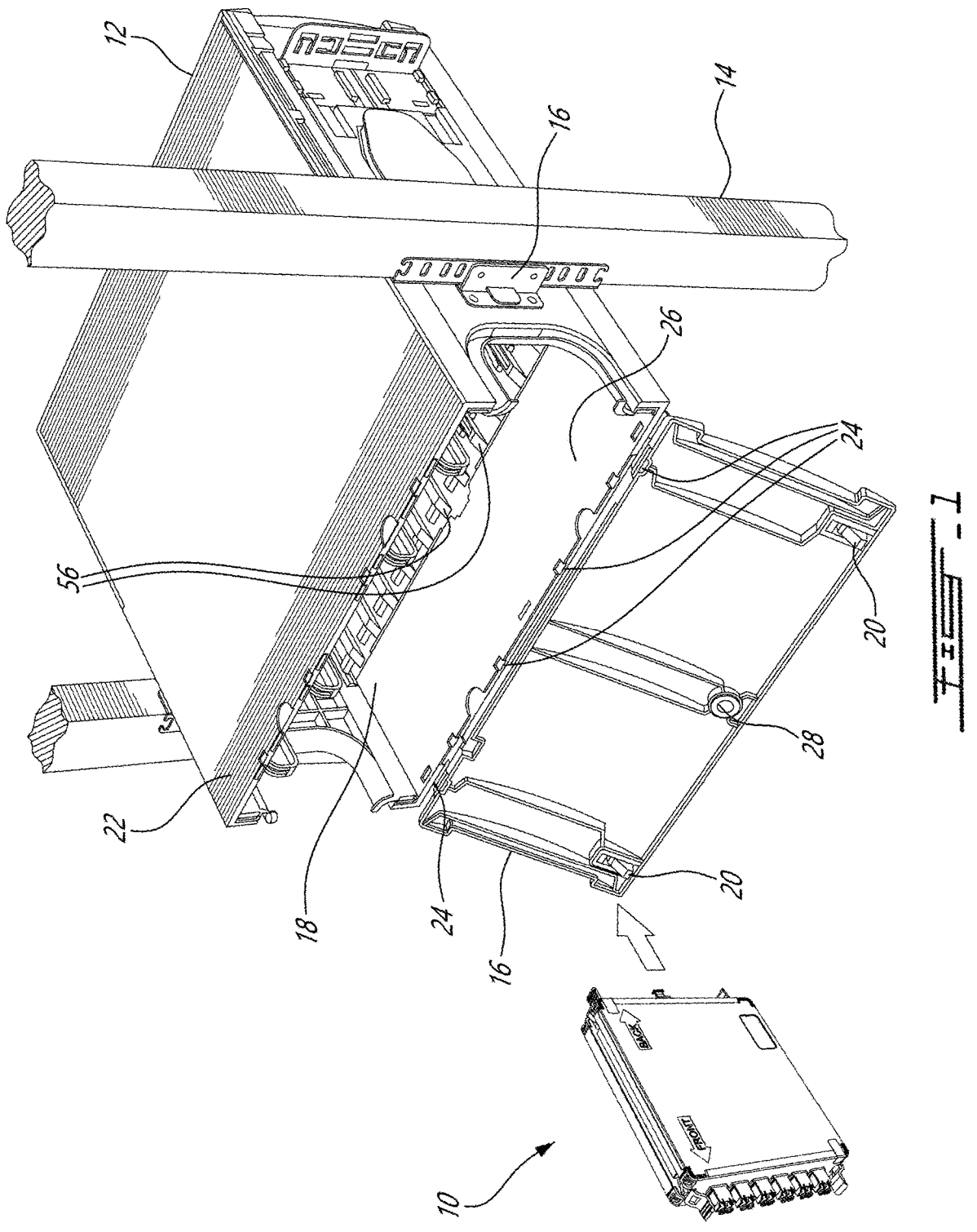
FIG. 1 provides a right raised front perspective view of a cross connect system in accordance with an illustrative embodiment of the present invention.

Referring now to FIG. 1, an optic fiber cassette and retainer assembly for same, generally referred to using the reference numeral 10, will now be described. The optic fiber cassette 10 is illustratively configured to fit together with a plurality of like cassettes within a rack mounted case 12, illustratively a 4U compatible case suitable for mounting to a 19" rack 14, for example through the use of brackets 16 or the like. The case 12 comprises a door 16 covering an opening 18. The door 16 comprises user actuatable latches 20 which engage slots (not shown) on an upper inner surface 22 of the case 12. Hinges 24 are provided between the lower inner surface 26 and the door 16 allowing the door 16 to be opened and pivoted out of the way when a user actuates the latches 20. To provide additional security, a keyed lock 28 may also be provided.{

Figure 2A:
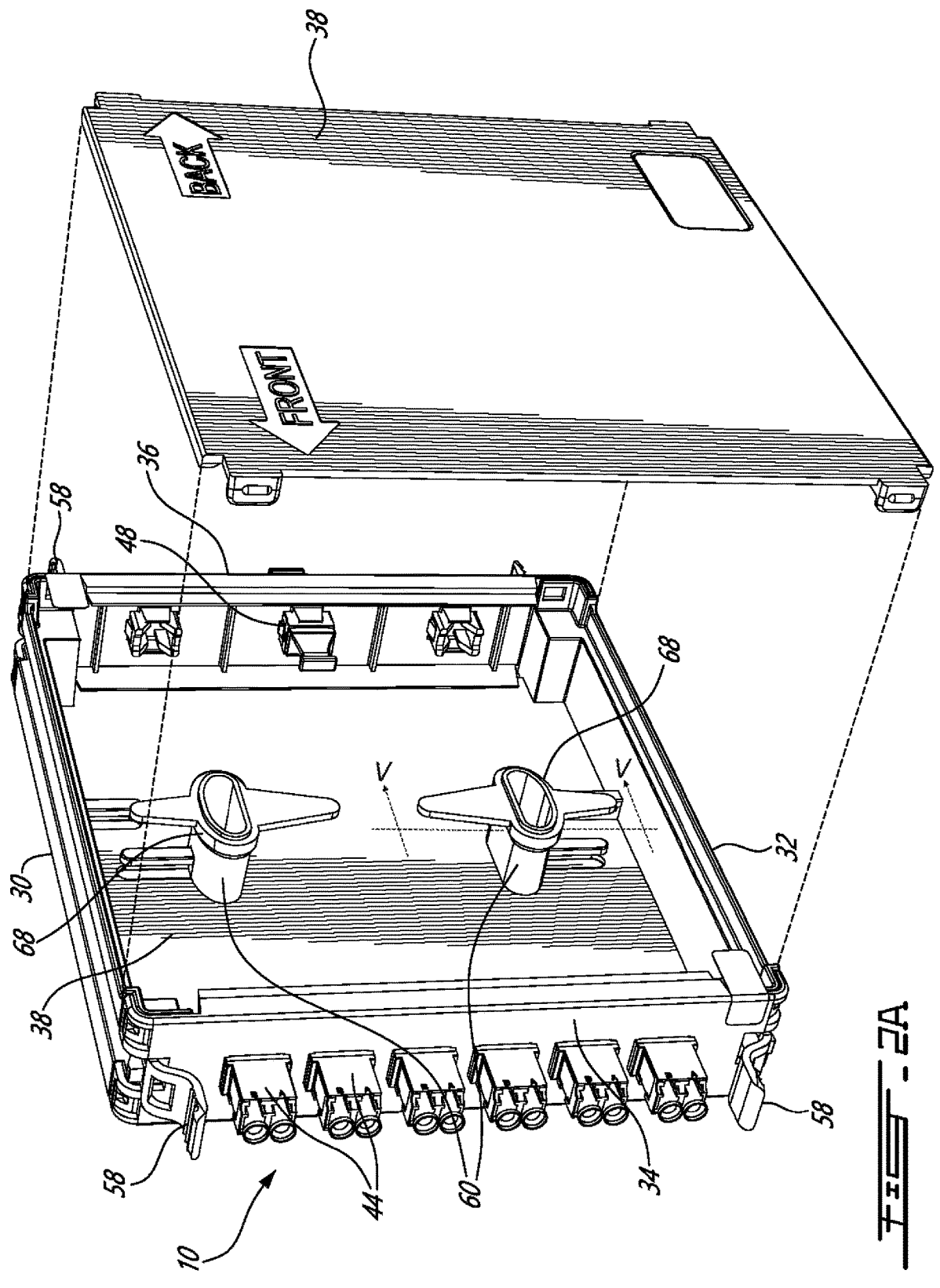
FIG. 2A provides a right raised front perspective view of a fiber optic cassette and retainer assembly for same in accordance with an illustrative embodiment of the present invention.
Figure 2B:
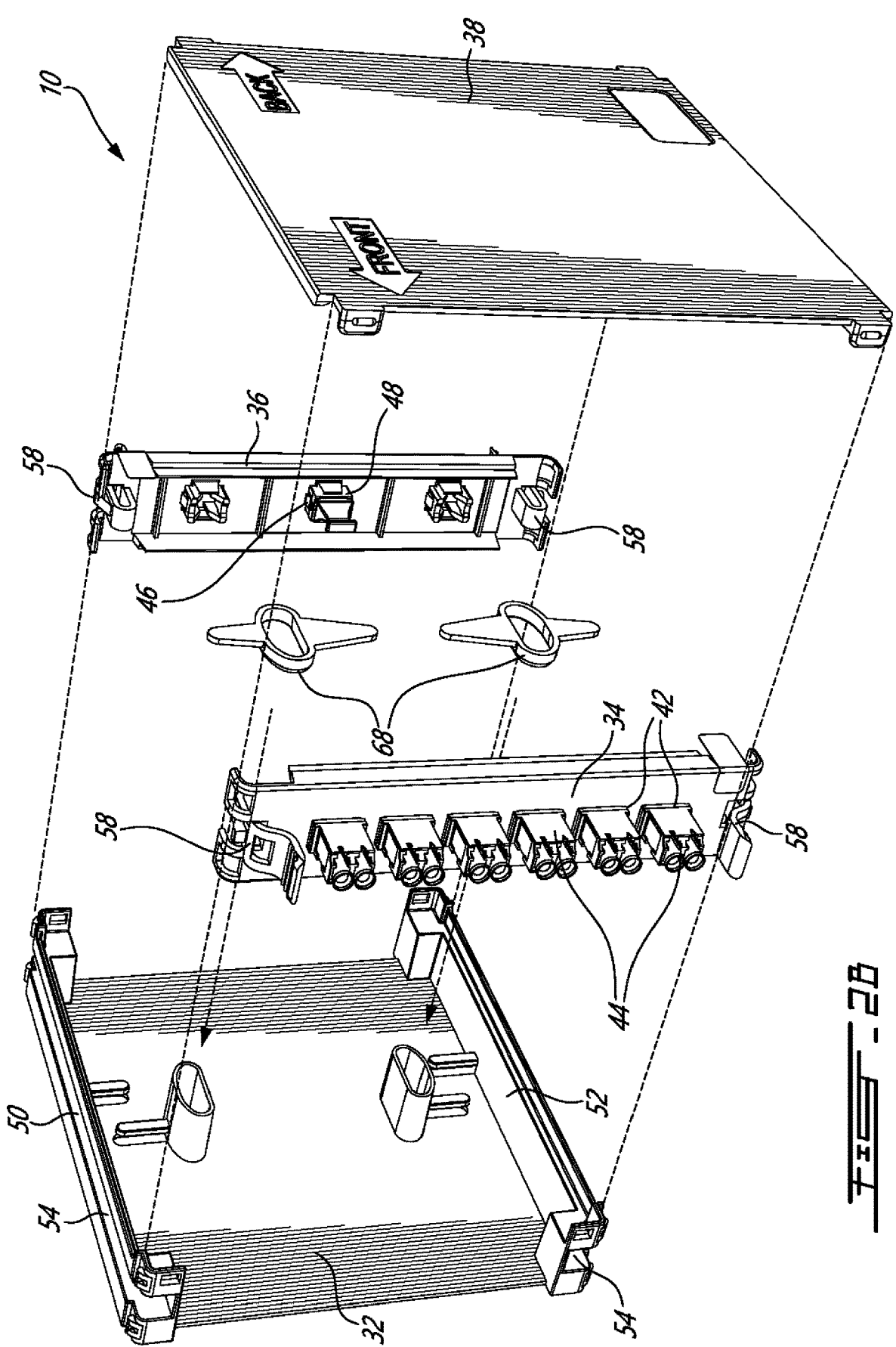
FIG. 2B provides a right raised front exploded perspective view of a fiber optic cassette and retainer assembly for same in accordance with an illustrative embodiment of the present invention.

Referring now to FIGS. 2A and 2B, each cassette 10 is comprised of a housing 30 comprising a base 32 and a first panel 34 positioned opposite a second panel 36. The base 32 and panels 34, 36 together define a fiber optic cable receiving space 38 for receiving, as will be discussed in more detail below, a plurality of optic fibers (not shown). In this regard, the first panel 34 and second panel 36 are snap fit to the base 32. A cover 40 is also provided to enclose the fiber optic cable receiving space 38. The front panel 34 comprises a series of cut outs 42 each configured for receiving respective ones of a plurality of fiber optic cable adaptors 44, such as a duplex LC type adaptor or the like. Similarly, the second panel 36 comprises at least one cut out 46 configured for receiving a respective fiber optic cable adaptor 48, such as a Multi-Fiber Push On (MPO) type adaptor or the like.

Still referring to FIGS. 2A and 2B, the base 32 comprises a pair of opposed side edges 50, 52 each comprising an elongate groove 54. The panels 34, 36 are removably secured to ends of the side edges 50, 52 by a locking mechanism and such, and for example such that during field installation the panels 34, 36 can be selected or replaced to accept different configurations of adaptors 44, 48.

Referring back to FIG. 1 in addition to FIGS. 2A and 2B, to insert a cassette 10 into the case 12, the grooves 54 are first aligned with respective ones of pairs of opposed rails 56, one (not shown) on the upper inner surface 22 and one on the lower inner surface 26 and which are received within their respective grooves 54. The cassette 10 is then slid into the case 12 and such that each of the pair of opposed rails 56 are received within their respective grooves 54. On full insertion, latch mechanisms 58 are engaged by the rails 56, thereby releasably securing the cassette 10 within the case 12.

Figure 3B:
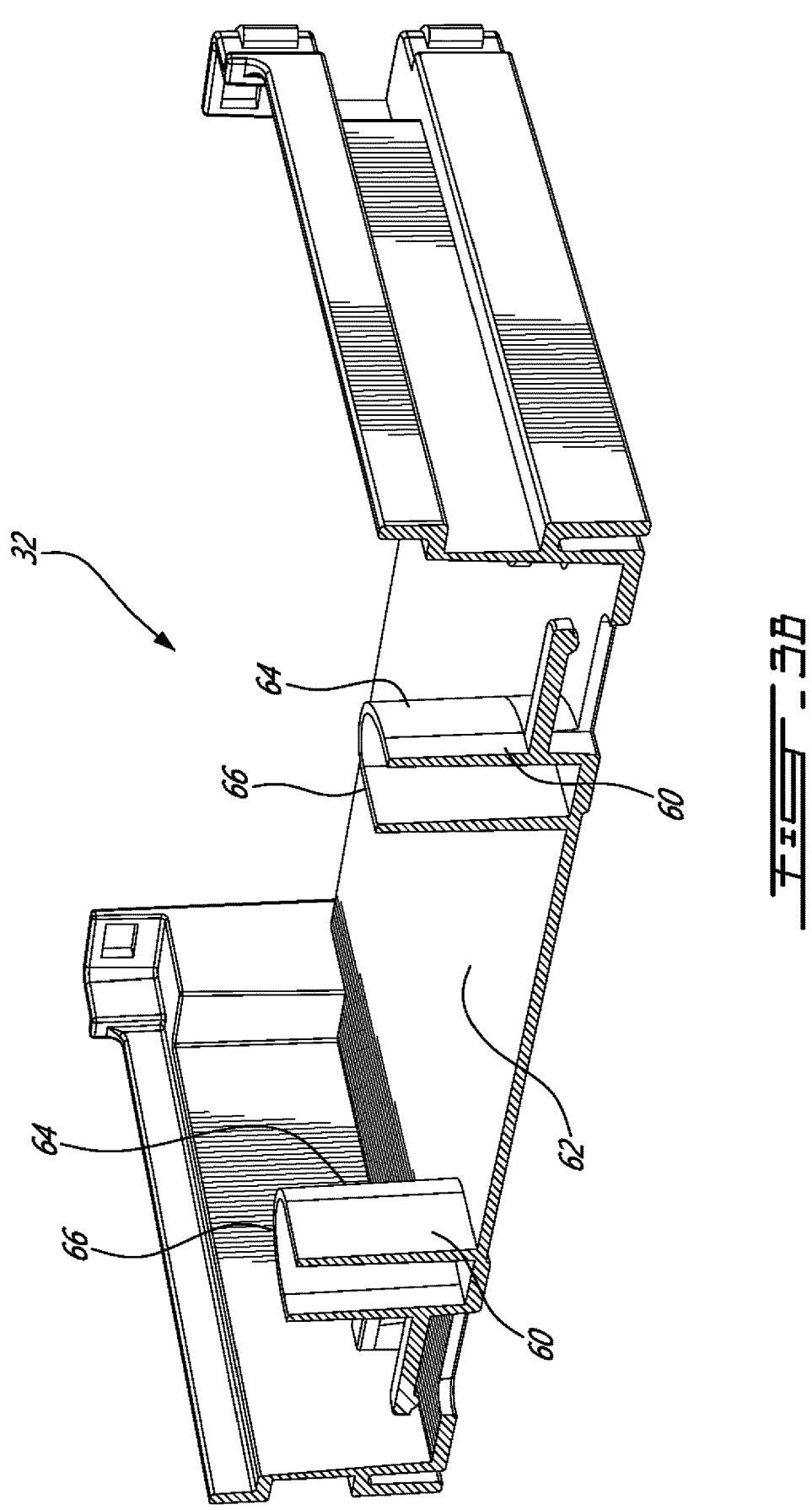
FIG. 3B provides a sectional view along line IIIB-IIIB in FIG. 3A.
Figure 3C:
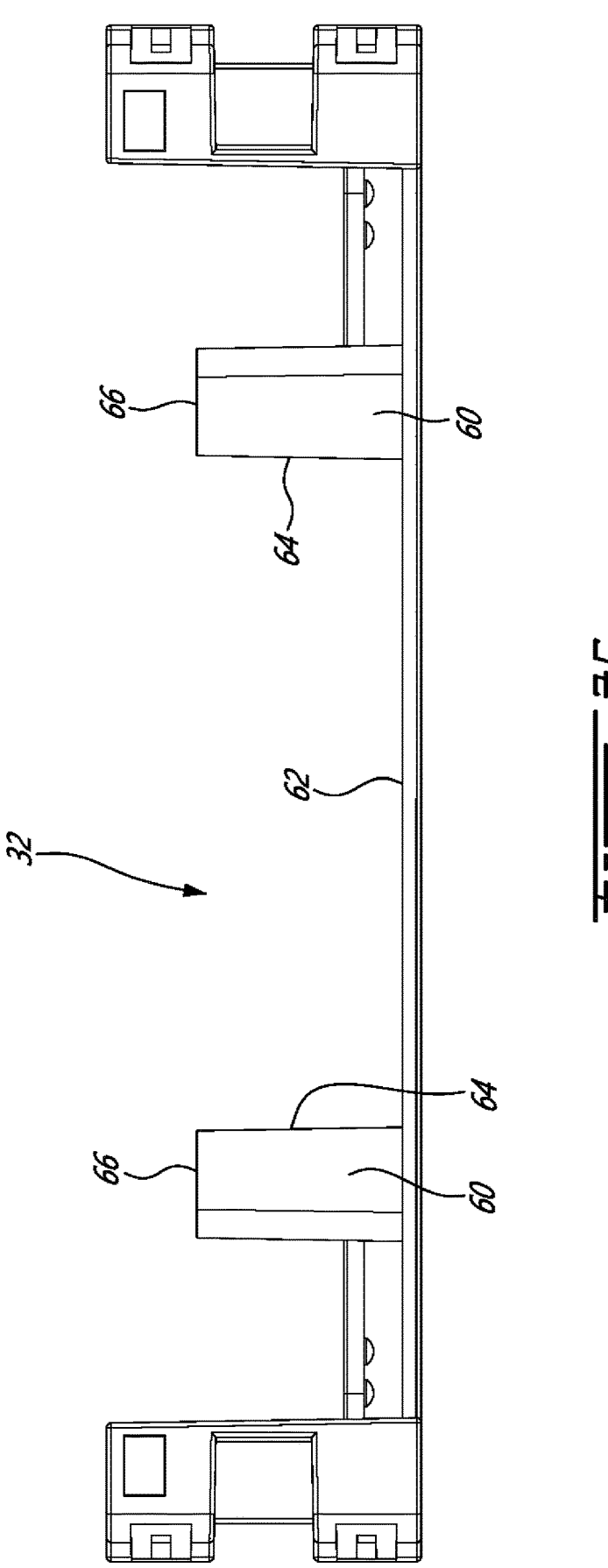
FIG. 3C provides side plan view of a fiber optic cassette housing in accordance with an illustrative embodiment of the present invention.

Referring now to FIGS. 3A, 3B and 3C in addition to FIGS. 2A and 2B, the base 32 further comprises a fiber retaining assembly illustratively comprising a pair of cable spools 60 which project upwards from a cable retaining surface 62 of the base 32. The pair of cable spools 60 are spaced from one another and illustratively arranged symmetrically on either side of a center of the cable retaining surface 62 and equidistant the first panel 34 and the second panel 36. As will be discussed in more detail below, the spools 58 each comprise a curved outer surface 64 which tapers towards an outer end 66 thereof. The curved outer surface 64 is slightly kidney-shaped in cross section with an outer radius R which ensures a suitable minimum bend radius of an optical fiber and such that an optimum bend radius of the intermediate portions of the optic fibers (not shown) adjacent the outer surface 64 is maintained. The fiber retaining assembly illustratively further comprises a removable optic fiber retainer 68.

Referring to FIGS. 4A though 4D in addition to FIGS. 3A, 3B and 3C, each removable optic fiber retainer 68 comprises a central portion 70 defining an aperture 72 which is dimensioned to fit snugly over the tapered outer end 66 of a respective one of the cable spools 60. In this regard, the inner surface 74 of the aperture 72 is slightly tapered with an angle ⊖, illustratively 3°, such that it corresponds to the outer surface 64 of the spool 60 and grips the outer surface 64 of the spool 60 in a light friction fit. An outer edge 76 of the wider opening of the aperture 72 is profiled to simplify insertion of the outer end 66 of the spool 60 into the aperture 72.

Still referring to FIGS. 4A though 4D, in a first embodiment the removable retainer 68 additionally comprises a pair of opposed optic fiber retaining fingers 78, 80 which extend away from the central portion 70. As will now be understood by a person of ordinary skill in the art, the retaining fingers 78, 80 prevent optic fibers (not shown) when curved about the cable spools 60 from being displaced, for example when the cassette 10 is arranged in an upright position or reversed. A second of the fingers 80 is larger and positioned adjacent a straight portion 82 of the aperture 72 to provide relative rigidity and such that the straight portion 82 remains relatively rigid during insertion of the outer end 66 of the cable spool 60 into the aperture 72. A first of the fingers 78 is smaller and positioned adjacent a curved portion 84 of the aperture 72 to provide relative flexibility and such that the curved portion 84 flexes during insertion of the outer end 66 of the cable spool 60 into the aperture 72.

Referring now to FIG. 5 in addition to FIGS. 4A though 4D, as a person of ordinary skill in the art will now understand, as the retainer 68 is slid on to the outer end 66 of the cable spool 60, the curved portion 84 flexes and such that the outer end 66 of the cable spool 60 is gripped by the central portion 70. In an embodiment travel of the retainer 68 along the outer end 66 of the cable spool 60 may limited by an abutment 86 which engages with outer edge 76 of the retainer 68. The gripping force generated by the curved portion 84 varies with a length of travel of the retainer 68 along the outer end 66 of the cable spool 60. In a particular embodiment the retainer 68 is placed on the outer end 66 of the cable spool 60 such that a small portion D of the outer end 66 of the cable spool 60 is visible above the upper surface 88 of the retainer 68. In a particular embodiment D is between 2 mm and a maximum 5.7 mm with the resulting the force required to disengage the retainer 68 from the friction fit is between 6N (Newtons) and 30N.

Figures 6A, 6B:
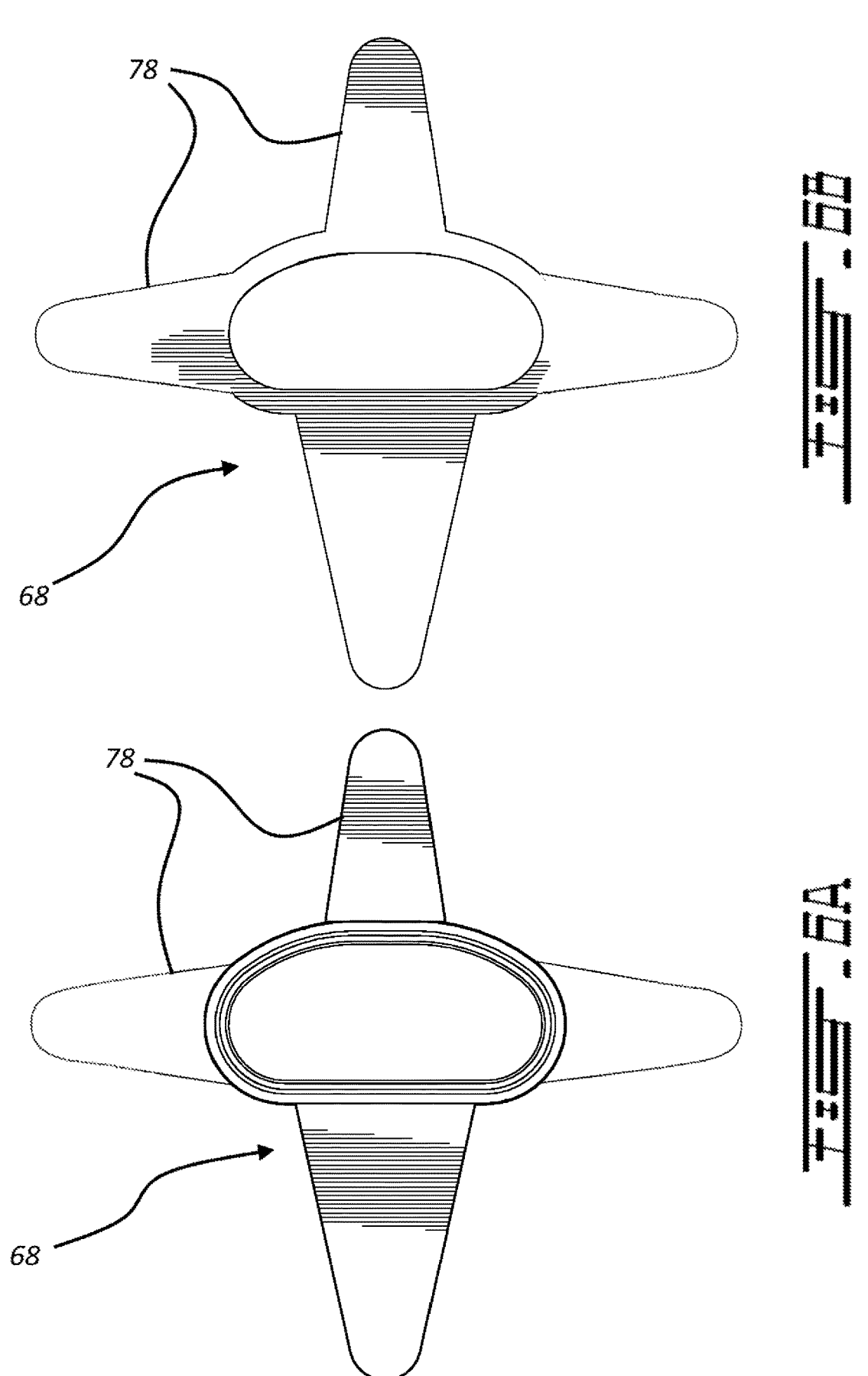
FIGS. 6A and 6B provide respectively top and bottom plan views of a retainer in accordance with an alternative illustrative embodiment of the present invention.

Referring now to FIGS. 6A and 6B, in an alternative embodiment, the retainer 68 may comprise a plurality of fingers 78 illustratively arranged at right angles to one another.

Although the present invention has been described hereinabove by way of specific embodiments thereof, it can be modified, without departing from the spirit and nature of the subject invention as defined in the appended claims.

The invention claimed is:

1. An optic fiber cassette, comprising:
   a housing;
   a pair of cable spools;
   a pair of retainers;
   wherein the housing comprises a cable retaining surface, a pair of side edges on opposite sides of the cable retaining surface, a first panel extending between first ends of the pair of side edges along a first edge of the cable retaining surface and a second panel extending between second ends of the pair of side edges along a second edge of the cable retaining surface, the cable retaining surface, the first panel, the second panel and the pair of opposed side edges together define a fiber optic cable receiving space;
   wherein each of the cable spools extends above the cable retaining surface within the fiber optic cable receiving space;
   wherein each of the cable spools are tapered inwards between the cable retaining surface and an outer end thereof;

wherein each of the retainers comprises a central portion defining an aperture;

wherein each of the retainers comprises a pair of fingers extending outwards in opposite directions from the central portion;

wherein an inner surface of the aperture is tapered and fits about the outer end of a respective one of the cable spools in a friction fit;

wherein a plurality of fiber optic cable adaptors are arranged along the first panel;

wherein at least one multi-fiber optic cable adaptor is arranged along the second panel;

wherein an optic fiber interconnects each of the plurality of fiber optic cable adaptors and one of the at least one multi-fiber optic cable adaptor; wherein an intermediate portion of each of the optic fibers is wound about each of the pair of cable spools;

wherein each of the retainers is installed on respective ones of the pair of cable spools; and wherein the fingers of each retainer extend away from the respective cable spool above the cable retaining surface.

2. The optic fiber cassette of claim 1, wherein each of the fingers of a given retainer are of different lengths.

3. The optic fiber cassette of claim 1, wherein the pair of cable spools are arranged symmetrically on either side of a center of the cable retaining surface and equidistant the first panel and the second panel.

4. The optic fiber cassette of claim 1, wherein the retainer is engaged on the cable spool by a friction fit and further wherein between 6N (Newtons) and 30N are required to disengage the retainer from the cable spool.

5. The optic fiber cassette of claim 3, wherein a first finger of a given retainer is arranged between the respective cable spool and a closest side edge and a second finger of the given retainer is arranged between the respective cable spool and the center of the cable retaining surface.

6. The optic fiber cassette of claim 1, further comprising a cover secured to the housing opposite the cable retaining surface thereby preventing access to the fiber optic cable receiving space.

7. The optic fiber cassette of claim 1, wherein the first panel is secured to the first edges and the second panel is secured to the second edges by a releasable locking mechanism.

8. The optic fiber cassette of claim 1, wherein a taper of each of the cables spools is 3° and wherein a taper of the inner surface is 3°.

9. An optic fiber cassette, comprising:

a housing comprising a cable retaining surface;

at least one fiber retaining assembly each comprising a cable spool extending above the cable retaining surface and a retainer towards an outer free end of the cable spool;

wherein for each of the at least one fiber retaining assembly:

the cable spool extends above the cable retaining surface;

the retainer comprises a central portion defining an aperture;

the retainer comprises a plurality of fingers extending outwards from the central portion; and an inner surface of the retainer fits about the outer free end of the cable spools in a friction fit;

wherein at least one first fiber optic cable adaptor is arranged along a first edge of the cable retaining surface;

6 wherein at least one second fiber optic cable adaptor is arranged along a second edge of the cable retaining surface; and wherein an optic fiber interconnects each of the at least one first fiber optic cable adaptor with the at least one second fiber optic cable adaptor.

10. The optic fiber cassette of claim 9, comprising two of the at least one fiber retaining assembly.

11. The optic fiber cassette of claim 9, wherein each retainer comprises a pair of fingers, each of the fingers extending away from the cable spool above the cable retaining surface.

12. The optic fiber cassette of claim 11, wherein the pair of fingers extend away from each other in opposite directions.

13. The optic fiber cassette of claim 9, wherein the cable spool is tapered inwards between the cable retaining surface and an outer end thereof and wherein an inner surface of the aperture is tapered and fits snugly about the outer end of the cable spool and wherein a taper of each of the cables spools is 3° and a taper of the inner surface is 3°.

14. The optic fiber cassette of claim 9, wherein for each at least one fiber retaining assembly the retainer is engaged on the cable spool by a friction fit and further wherein between 6N and 30N are required to disengage the retainer from the cable spool.

15. An optic fiber cassette, comprising:

a housing;

at least one cable spool comprising a central portion defining an aperture;

at least one retainer;

wherein the housing comprises a cable retaining surface;

wherein each of the at least one cable spool extends above the cable retaining surface;

wherein each of the at least one retainer is secured to an outer free end of a respective one of the at least one cable spool;

wherein an inner surface of the aperture fits about the outer end of the at least one cable spool;

wherein the inner surface of the aperture is retained to the outer end of the at least one cable spool by a friction fit; and wherein each of the at least one retainer comprises at least one finger.

16. The optic fiber cassette of claim 15, wherein each of the at least one finger extends outward away from the central portion.

17. The optic fiber cassette of claim 15, wherein each of the at least one cable spool is tapered inwards between the cable retaining surface and an outer end thereof and wherein a taper of the at least one cables spools is 3°.

18. The optic fiber cassette of claim 15, wherein a taper of the inner surface is 3°.

19. The optic fiber cassette of claim 15, wherein the at least one retainer is engaged on a respective one of the at least one the cable spool by a friction fit and further wherein between 6N and 30N are required to disengage the at least one retainer from the respective at least one cable spool.

20. The optic fiber cassette of claim 15, wherein the housing comprises a pair of side edges on opposite sides of the cable retaining surface, a first panel extending between first ends of the pair of side edges along a first edge of the cable retaining surface and a second panel extending between second ends of the pair of side edges along a second edge of the cable retaining surface, the cable retaining surface, the first panel, the second panel and the pair of opposed side edges together define a fiber optic cable receiving space.

21. The optic fiber cassette of claim 15, wherein at least one fiber optic cable adaptor is arranged along a first edge of the cable retaining surface, wherein at least one multi-fiber optic cable adaptor is arranged along a second edge the cable retaining surface and wherein an optic fiber interconnects each of the at least one fiber optic cable adaptor and the multi-fiber optic cable adaptor.

22. The optic fiber cassette of claim 15, wherein the at least one finger of the at least one retainer extends away from the respective cable spool above the cable retaining surface.

\* \* \* \* \*